United States Patent [19]
Sellers

[11] Patent Number: 5,864,334
[45] Date of Patent: Jan. 26, 1999

[54] COMPUTER KEYBOARD WITH SWITCHABLE TYPING/CURSOR CONTROL MODES

[75] Inventor: Charles A. Sellers, Houston, Tex.

[73] Assignee: Compaq Computer Corporation, Houston, Tex.

[21] Appl. No.: 884,181

[22] Filed: Jun. 27, 1997

[51] Int. Cl.$^6$ .................................................. G09G 5/00
[52] U.S. Cl. ......................... 345/168; 345/156; 345/158
[58] Field of Search .................................. 345/161, 168, 345/156, 157, 145, 158, 172; 200/311, 312, 314; 382/42; 361/680; 364/188; 400/472

[56] References Cited

U.S. PATENT DOCUMENTS

| | | | |
|---|---|---|---|
| 5,168,531 | 12/1992 | Sigel | 382/42 |
| 5,245,321 | 9/1993 | Franz et al. | 345/172 |
| 5,367,315 | 11/1994 | Pan | 345/156 |
| 5,408,060 | 4/1995 | Muurinen | 200/314 |
| 5,414,444 | 5/1995 | Britz | 345/156 |
| 5,426,450 | 6/1995 | Drumm | 345/168 |
| 5,485,614 | 1/1996 | Kocis et al. | 361/680 |
| 5,521,616 | 5/1996 | Capper et al. | 345/156 |
| 5,528,263 | 6/1996 | Platzker et al. | 345/156 |
| 5,617,312 | 4/1997 | Iura et al. | 364/188 |
| 5,675,361 | 10/1997 | Santilli | 345/168 |
| 5,686,942 | 11/1997 | Ball | 345/158 |
| 5,707,160 | 1/1998 | Bowen | 400/472 |
| 5,734,375 | 3/1998 | Knox et al. | 345/168 |
| 5,736,976 | 4/1998 | Cheung | 345/168 |

Primary Examiner—Steven J. Saras
Assistant Examiner—Amr Awad
Attorney, Agent, or Firm—Konneker & Smith

[57] ABSTRACT

The keyboard portion of a computer has a small toggle switch structure positioned among its keys and reachable by a user while his hands are in the home row typing position. The switch structure is used to selectively switch the computer between typing and cursor control modes. When the computer is switched to its cursor control mode by depressing a stick-like activation portion of the switch structure, a small video camera mounted above the keyboard monitors an observation zone above the keyboard. A cursor control system in which the camera is incorporated detects the presence of the user's hand in a first predetermined configuration within the observation zone, tracks the hand's cursor control movement through the zone, and correspondingly moves the cursor on the computer's display screen. To carry out a cursor "pick" function in conjunction with the repositioned cursor, the user reshapes his hand to a second predetermined configuration. The system detects the second hand configuration and responsively generates an appropriate cursor pick signal. When the user desires to return the computer to its typing mode he either depresses the activation portion of the toggle switch structure or moves his control hand out of the observation zone, moves the hand back into the zone, and presses any of the keys. The video controlled cursor positioning system is representatively illustrated in both a portable and desktop computer embodiment.

29 Claims, 5 Drawing Sheets

COMPUTER KEYBOARD WITH SWITCHABLE TYPING/CURSOR CONTROL MODES

CROSS-REFERENCE TO RELATED APPLICATION

This application discloses subject matter similar to that illustrated and described in copending U.S. application Ser. No. 08/863,870 now U.S. Pat. No. 5,821,922, filed on May 27, 1997, entitled "COMPUTER HAVING VIDEO CONTROLLED CURSOR SYSTEM", and assigned to the same assignee as this application.

BACKGROUND OF THE INVENTION

1. Field of the Invention

The present invention generally relates to electronic apparatus and, in a preferred embodiment thereof, more particularly relates to cursor control systems for computers.

2. Description of Related Art

A variety of display screen cursor control systems have previously been utilized on or adjacent the keyboard portion of both desktop and portable computers. These cursor control devices include mice, trackballs, touchpads and pointing sticks.

The computer mouse is basically a small housing which has a ball on its underside that is rolled by the computer user along a horizontal support surface adjacent the keyboard in response to hand movement of the mouse housing parallel to the support surface. The sense and speed of the rotation of the mouse ball is monitored and appropriately converted to a positional output signal used to correspondingly reposition the cursor on the computer. The mouse housing typically has at least one "pick" button thereon which may be depressed to select an icon to which the cursor has been moved, or simply to select a desired screen location.

A track ball is basically an inverted mouse with the ball facing upwardly for direct manipulation by the computer user's fingers. The track ball is typically mounted on the base housing of a portable computer adjacent one or more "pick" buttons associated with the ball.

A touchpad typically has a small, generally planar rectangular surface along which the user runs his finger in the desired direction of cursor movement. A sensing structure beneath the user-engaged surface converts his finger movements to appropriate cursor movement signals. As in the case of the track ball and mouse, the touchpad is typically placed adjacent one or more manually depressible "pick" buttons.

A pointing stick is typically placed among and projects upwardly beyond a group of keyboard key cap members—usually in a generally central location of the keyboard between the user's index fingers in their "home" typing positions. Either index finger may be used to tilt the vertically oriented pointing stick in the desired direction of cursor movement, with a pressure sensing base portion of the pointing stick structure detecting the rocking movement of the stick and transforming the detected stick into corresponding cursor movement signals.

A recent potential addition to these types of cursor control devices, a two dimensional optical digitizer device, is illustrated and described in pending U.S. application Ser. No. 08/486,310, filed on Jun. 7, 1995, and pending U.S. application Ser. No. 08/651,881, filed on Jun. 4, 1996, each of such pending applications being assigned to the same assignee as this application. These digitizer devices utilize a single source of light to form a generally planar two dimensional light pattern disposed over and generally parallel to a computer keyboard. A finger placed in the light pattern interrupts a corresponding portion thereof, with the interruption location being sensed and used to transmit positional information to the display screen to selectively move a cursor thereon. A remote switch is used to activate this optically scanned cursor control mode, in which the movement of the user's hand in the scanned is used to correspondingly move the display screen cursor, and to return the keyboard to its typing mode.

Various problems, limitations and disadvantages are typically associated with these previously proposed types of cursor control devices and systems. It is to these problems, limitations and disadvantages that the present invention is directed.

For example, the computer mouse requires a substantial amount of unobstructed desktop space adjacent the keyboard to be moved around in. Also, many computer mice are configured for right hand use, making them awkward for the left-handed user. The trackball is typically integrated into the system keyboard area in a fixed location which is usually a compromise based on where there is space in the system. Accordingly, the trackball can often be somewhat awkward to use.

The touchpad, like the trackball, is typically integrated into a fixed area of the system keyboard structure. Additionally, the touchpad usually has a relatively small surface area along which the user's finger can be moved to correspondingly move the display screen cursor. Accordingly, the touchpad tends to be rather inconvenient to use when long cursor movements are required.

The pointing stick is the smallest of the conventionally utilized cursor positioning devices and thus may be very compactly located on the keyboard structure. However, the small size of this device makes it somewhat difficult for some users to properly engage and use cursor control and repositioning. Additionally, since the pointing stick is usually centrally located in the keyboard it often must be separated a substantial distance from its associated selection buttons. This, too, is often considered undesirable by computer users. Moreover, due to the "rocking" motion that must be imparted to the pointing stick to operate it, the use of the stick is considered by many users to be at least to some degree counterintuitive.

The optical digitizers mentioned above require for the generation and maintenance of their two dimensional optical fields above and generally parallel to the keyboard a variety of reflector, interceptor and light generating members mounted in exposed orientations on the keyboard. Additionally, these digitizer systems require, for a switchover between their typing and cursor control modes, that a control member located out of the sensing area of the optical scanning area be pressed and held down during the cursor control mode, and released when it is desired to return to the typing mode of the keyboard.

Like various other forms of cursor control associated with a computer keyboard, this requires the user to remove his hand or hands from the home row key position, thereby reducing the efficiency of using the keyboard and cursor device. Keeping the hands in the home row position is the main reason for having the cursor control device located over the keyboard. Having to manipulate a button or other control member located off the keyboard area, for either cursor positioning or selection operations, can be fatiguing and inconvenient, and can limit single hand operation of the cursor control device.

It would thus be desirable to provide apparatus which would enable a computer user to selectively and reliably switch between a typing and cursor control mode while maintaining his hands generally in their home row typing position above the keyboard, and move the display cursor and perform related pick functions while maintaining his hands above the keyboard.

SUMMARY OF THE INVENTION

In carrying out principles of the present invention, in accordance with a preferred embodiment thereof, computer apparatus is provided that comprises a keyboard having a series of manually depressible keys disposed on its top side, the keys having a home typing row, and a screen upon which a movable cursor may be displayed. Representatively, the computer apparatus is a portable notebook computer, but the keyboard may also be, for example, the keyboard portion of a desktop computer system.

Incorporated in the computer apparatus is an observation system which is operable to monitor a three dimensional observation zone extending along the top side of the keyboard. Representatively, the observation system includes a video camera supportable in an elevated relationship with the keyboard and operative to monitor the observation zone.

The computer apparatus also includes control circuitry associated with the observation system and having a typing mode and a cursor control mode. The control circuitry, when in its cursor control mode, is operative in response to detection by the observation system of a control movement of a hand of a user (or another object) through the observation zone to generate a control signal and use the control signal to move the cursor on the screen in a manner corresponding to the detected control movement.

A manual switch structure is associated with the keyboard and is operable to selectively switch the control circuitry between its typing and cursor control modes. With the system switched to its typing mode, hand movement through the observation zone has no effect on the cursor position.

In a preferred embodiment of the invention, the control circuitry is further operative to differentiate between different configurations of the user's hand within the observation zone and alter the control signal in different manners correlated to each configuration. For example, in addition to tracking the movement of the user's hand in a first configuration thereof through the observation zone when the system is switched to its cursor control mode, and correspondingly moving the cursor on the screen, the control circuitry is further operative to alter the control signal in a manner using the cursor to select an area of the screen in response to the presence of the user's hand in a second, "pick" configuration within the observation zone.

In accordance with another aspect of the invention, the control circuitry is further operative to switch from the cursor control mode to the typing mode not only in response to the use of the manual switch structure, but also in response to the sequential detection by the observation system of a withdrawal of the user's hand from the observation zone, the re-entry of the user's hand into the observation zone, and the depression of one of the keyboard keys.

According to other features of the invention, the switch structure is reachable and operable by a user of the computer apparatus while the user's fingers generally remain on the home typing row of the keyboard keys. The switch structure has a depressible actuation portion projecting upwardly between a plurality of the keys. The actuation portion may be pressed and released to activate one of the typing and cursor control modes, and then pressed and released again to activate the other mode. Visual indicia means are operative to provide the actuation portion with a first appearance in response to activation of the typing mode, and a second, different appearance in response to activation of the cursor control mode. Preferably, the visual indicia means are operative to provide the switch structure actuation portion with a first coloration in response to activation of the typing mode, and a second coloration in response to activation of the cursor control mode.

In a preferred embodiment of the manual switch structure, its activation portion is a vertically oriented cylindrical plastic light tube member having a bottom end portion slidably extending through an opening in a housing disposed beneath the keys, and an upper end portion extending upwardly between an adjacent plurality of the keys. A toggle switch mechanism is disposed in the housing beneath the lower end of the light tube, is operatively connected to the control circuitry, and is actuated each time the light tube member is downwardly pressed by the computer user.

Also disposed within the housing, and operatively connected to the control circuitry, is a two-color LED light element which is switched from one of its colors to its other color each time the light tube is depressed. The light element alternately illuminates the light tube in these two colors each time the switch is activated by the user, thereby providing the user with a visual indicia as to whether the computer is in its typing mode or its cursor control mode.

DETAILED DESCRIPTION

Figure 1:
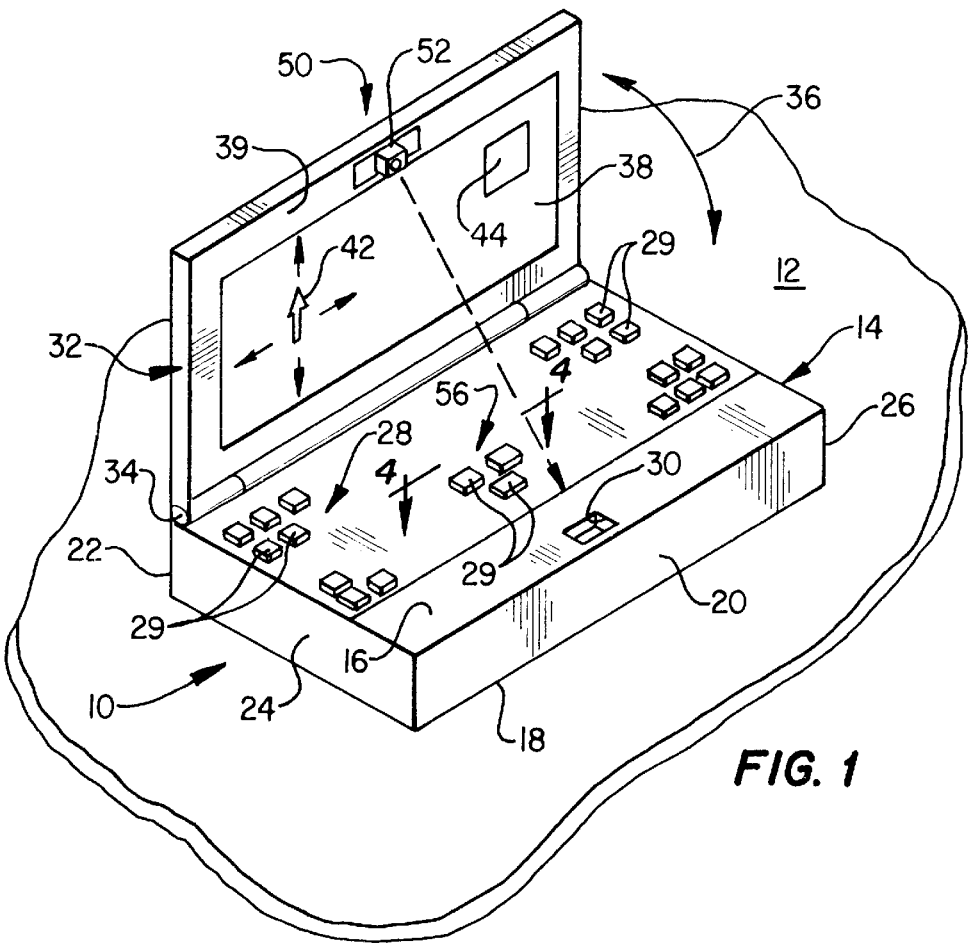
FIG. 1 is a simplified perspective view of a representative portable computer incorporating therein a specially designed video controlled cursor system embodying principles of the present invention.

Perspectively illustrated in simplified form in FIG. 1 is a representative portable notebook computer 10 that incorporates therein a specially designed video controlled cursor system which embodies principles of the present invention and is subsequently described in detail herein. The portable computer 10 is shown resting atop a suitable horizontal support surface, such as a desktop 12, and includes a rectangular base housing 14 having top and bottom sides 16 and 18, front and rear sides 20 and 22, and left and right ends 24 and 26. A keyboard assembly 28, having individual keys 29, is mounted on a rear portion of the top side 16. For reasons later described herein, a central rectangular recess 30 is formed in the top side 16 of the base housing 14 in front of the keyboard assembly 28.

In addition to the base housing 14 the computer 10 also includes a somewhat thinner rectangular lid housing 32 which is hinge-secured, as at 34, to a rear top side portion of the base housing 14 for pivotal movement relative thereto (as indicated by the double-ended arrow 36 in FIG. 1) between a generally upright open use orientation (shown in FIG. 1) in which the lid housing 32 exposes the keyboard 28, and a downwardly tilted closed storage and transport orientation in which the lid housing 32 extends across and parallel to the top base housing side 16 and covers the keyboard 28. Suitable latch means (not shown) are provided for releasably locking the lid housing 32 in this closed storage and transport orientation thereof.

Lid housing 32 has a rectangular display screen 38 mounted on the front or inner side 39 thereof, the display screen 38 facing forwardly and being exposed to user view, as shown in FIG. 1, when the lid housing 32 is in its open use orientation. The computer 10 is provided with display screen circuitry 40 (see FIG. 3) which is operative to display on the screen 38 a cursor 42 and a selectable icon 44. As later described herein, cursor control circuitry 46 (see FIG. 3) may be operated to selectively move the cursor 42 upwardly, downwardly, leftwardly and rightwardly along the display screen 38 as indicated by the movement arrows adjacent the cursor 42 in FIG. 1.

Figure 2:
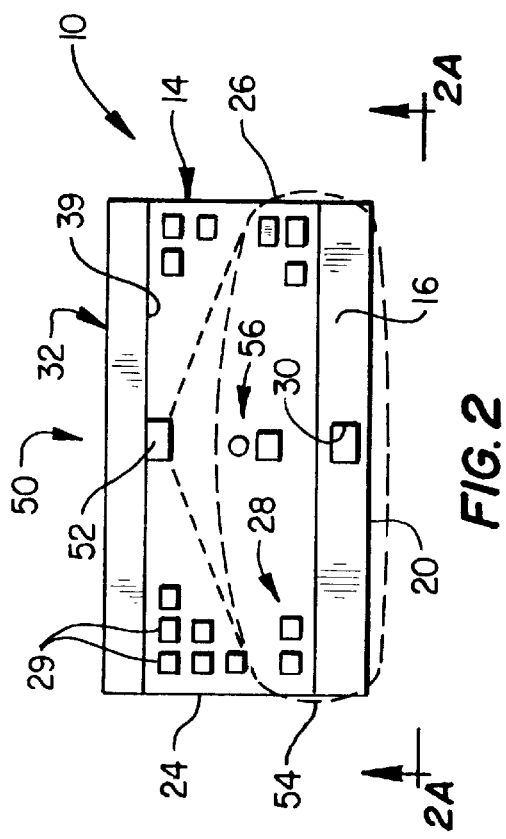
FIG. 2 is a reduced scale simplified top plan view of the portable computer and illustrates a video camera-monitored cursor control hand observation zone.
Figure 2A:
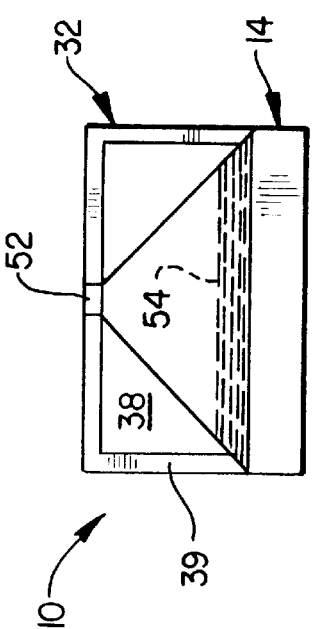
FIG. 2A is a reduced scale simplified front side elevational view of the portable computer and also illustrates its cursor control hand observation zone.
Figure 3:
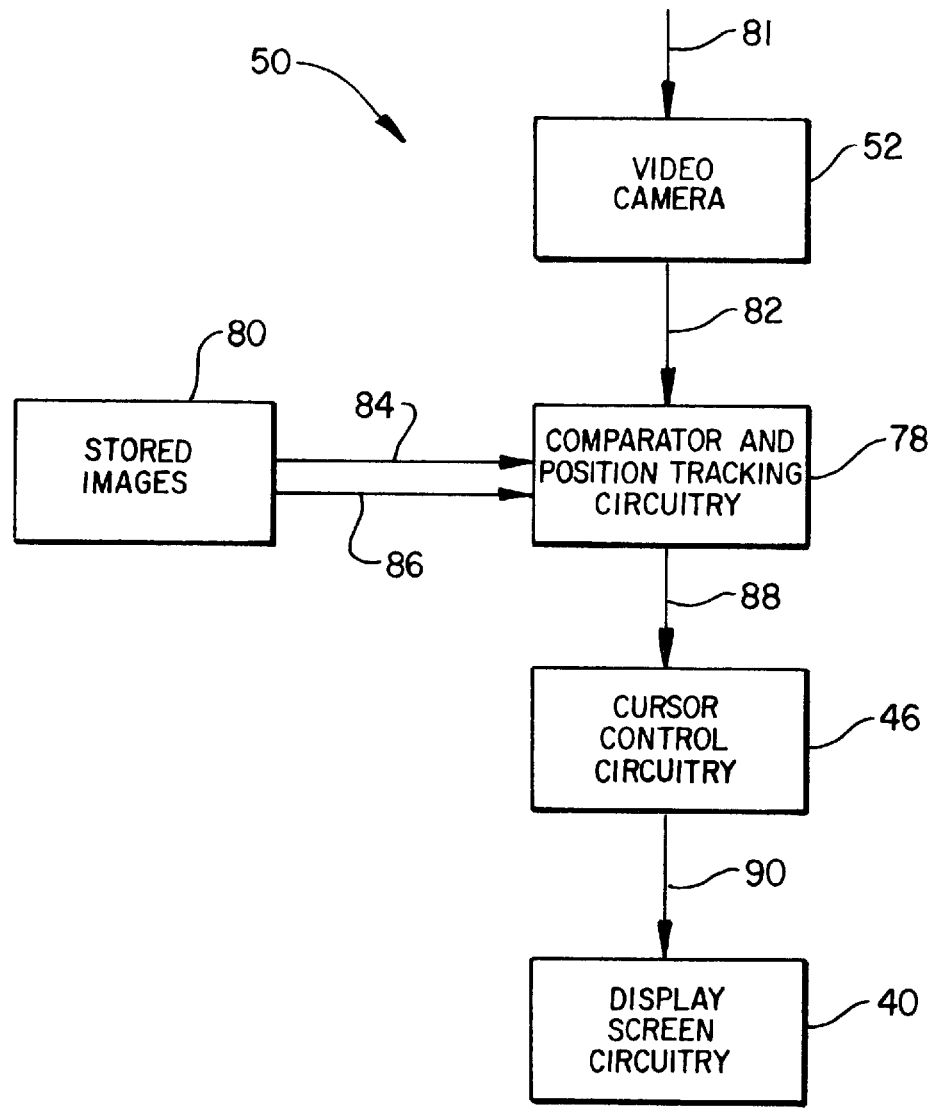
FIG. 3 is a simplified, highly schematic block diagram of the computer circuitry in the cursor control system.

Referring now to FIGS. 1–3, the video controlled cursor system 50 includes a small video camera 52 centrally mounted on and projecting outwardly from a top portion of the lid housing front side 39 above the top edge of the display screen 38. When the lid housing 32 is closed, the outwardly projecting video camera 52 is protectively received in the base housing top side recess 30. With the lid housing 32 opened, the video camera 52 monitors a three dimensional in-focus observation zone 54 disposed over a front top side portion of the base housing 14 (see FIGS. 2 and 2A).

According to a key aspect of the present invention, in a manner subsequently described herein the computer 10 is provided with switchable typing and cursor control modes. With the system switched to its cursor control mode the camera-monitored observation zone 54 is used as a cursor control area within which a hand of the computer user may be manipulated in one predetermined configuration to move the cursor 42 around the display screen 38, and then placed in a second predetermined configuration to perform a selection or "pick" action once the cursor is relocated to a desired position on the screen. The system 50 automatically senses both the position and configurations of the cursor control hand and correspondingly repositions the cursor and generates the desired pick function in conjunction with the repositioned cursor. When the computer 10 is switched to its typing mode, hand movements through the observation zone 54 have no effect on the cursor position.

Figure 4:
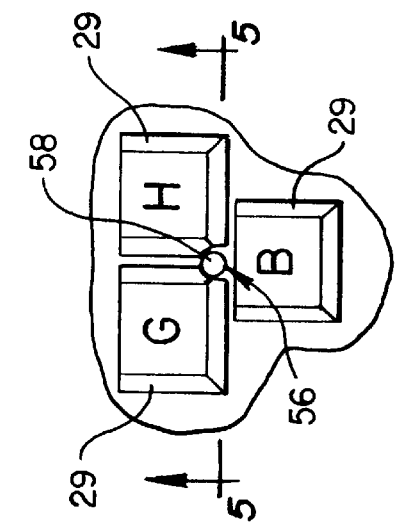
FIG. 4 is an enlarged scale top plan view, taken along line 4—4 of FIG. 1, of a specially designed typing/cursor control mode selection switch structure embodying principles of the present invention.
Figure 5:
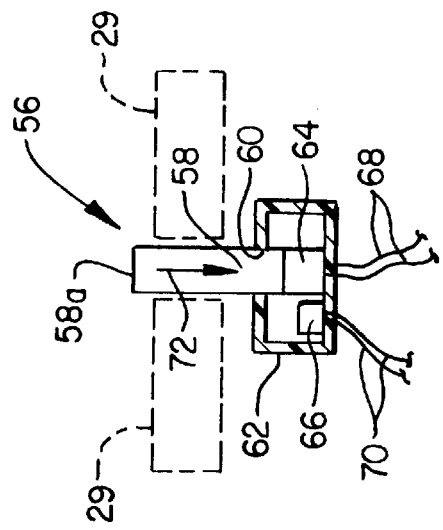
FIG. 5 is an enlarged scale schematic cross-sectional view through the switch structure taken along line 5—5 of FIG. 4.

To permit the computer user to very quickly and reliably switch back and forth between the typing and cursor control modes, the present invention provides a specially designed switch structure 56 which is shown in FIGS. 1, 4 and 5. Switch structure 56 includes a vertically oriented cylindrical switch member 58 which is conveniently positioned in a central location of the "home row" of the keys 29—preferably between the "G", "H" and "B" keys 29 as shown in FIG. 4. The switch member 58 is preferably a clear plastic light tube and has, as best illustrated in FIG. 5, an upper tip portion 58a that projects upwardly past the top sides of the adjacent keys 29.

A lower end portion of the switch member 58 slidably extends downwardly through a circular opening 60 in the top side of an underlying housing 62 (see FIG. 5) and engages the top end of a conventional push-push type electrical toggle switch 64 disposed in the housing 62 next to a two color LED light element 66. The toggle switch 64 and the LED light element 66 are respectively coupled to the cursor control system 50 by electrical leads 68 and 70. With the system in its typing mode, the light 66 is switched to its first color (for example, red) so that the exposed upper tip 58a of the switch member 58 is also red to provide the user with a visual indication that the system is in the typing mode.

To quickly switch the system to its cursor control mode, while the user's hands are still conveniently in their home row typing positions on the keys 29, the user simply reaches over with one of his index fingers and pushes down on the upper end of the switch member 58, as indicated by the arrow 72 in FIG. 5, and then releases the switch member 58. The downward movement and subsequent release of the cylindrical switch member 58 changes the underlying toggle switch 64 from its typing mode configuration to its cursor control mode configuration and thus, via the leads 68, switches the system 50 from the typing mode to the cursor control mode. When this occurs, the system 50 operates to change the LED light from its typing mode color (representatively red) to its cursor control mode color (representatively green). The release of the switch member 58 permits a spring structure in the underlying toggle switch 64 to vertically return the switch member 58 to its original position in which its now green upper end portion 58a is exposed to view to provide the computer user with a visual indicia that the system has been switched to its cursor control mode.

With the system 50 switched to its cursor control mode, the user can move one of his hands through the camera-monitored observation zone 54 to move the cursor 42 and carry out an associated "pick" function as later described herein. When the user is ready to return the system to the typing mode he simply depresses the switch member 58 again, thereby clicking the toggle switch 64 again and returning the LED light (and thus the switch member 58) to its original red color. Alternatively, the user can remove his control hand from the in-focus observation zone 54 and then re-enter the zone 54 and press any of the keys 29 with one of his fingers. As later described herein, the system 50 is operative to sense the withdrawal of the control hand from the zone 54, and the hand's re-entry into the zone 54 and subsequent depressing of one of the keys 29, and responsively re-activate the typing mode without the depression of the switch member 58.

Figure 6A:
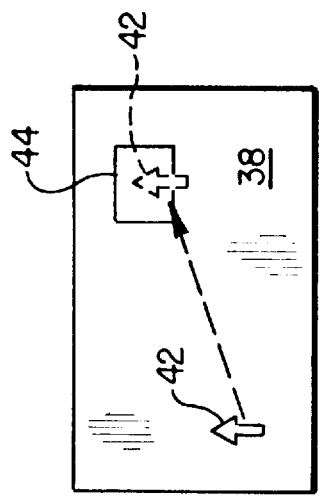
FIG. 6A is a schematic illustration of the computer display screen showing the cursor operation resulting from the user hand movement in FIG. 6.
Figure 7A:
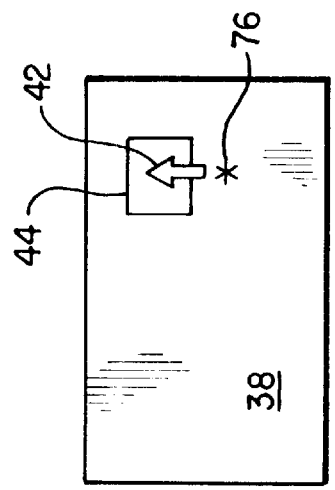
FIG. 7A is a schematic illustration of the computer display screen showing the pick function being generated in response to the user's hand control shown in FIG. 7.
Figure 6:
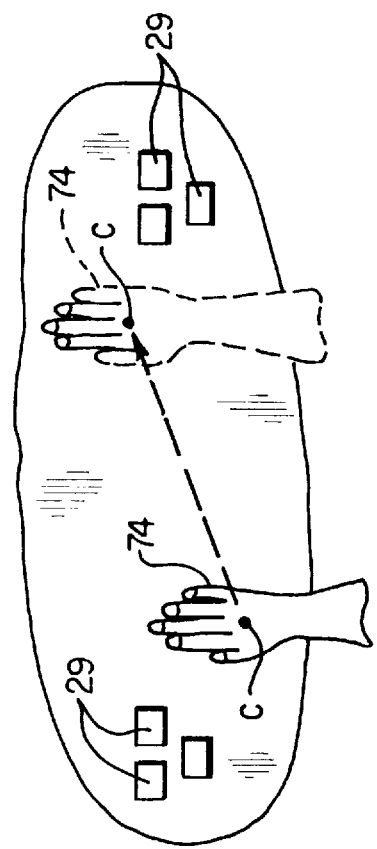
FIG. 6 is a schematic top plan view of the cursor control hand observation zone and illustrates a user's hand positioned therein and being used in a first predetermined configuration to move the computer's display screen cursor.
Figure 7:
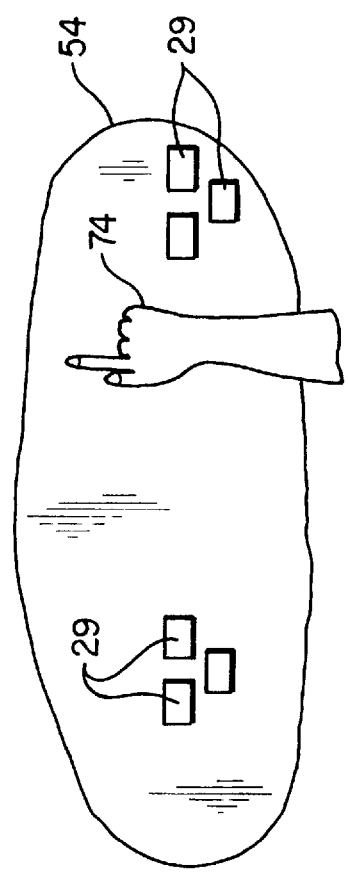
FIG. 7 is a schematic top plan view of the cursor control hand observation zone and illustrates a user's hand positioned therein and being used in a second predetermined configuration to execute a cursor "pick" function.

The basic operation of the video controlled cursor system 50 is illustrated in simplified pictorial form in FIGS. 6–7A. After the system 50 has been switched to its cursor control mode, to move the cursor 42, for example, upwardly and to the right on the display screen 38, the user places his right hand 74 in a flattened, palm down configuration (shown in FIG. 6) within the observation zone 54. As later described herein, the system 50 detects the flattened hand configuration and determines the location of the centroid C of the hand.

Next, the user moves his hand 74 rearwardly and to the right through the observation zone 54, from the solid line position of the hand to the dotted line position of the hand in FIG. 6. The system 50 tracks the movement of the hand centroid C and correspondingly moves the cursor 42 from its solid line position on the display screen 38 in FIG. 6A to its upwardly and rightwardly shifted dotted line position in FIG. 6A—representatively within the selectable icon 44.

After the user repositions the cursor in this manner, using his hand in a first predetermined configuration as shown in FIG. 6, he manipulates his hand 74 within the observation zone 54 to a second predetermined configuration—representatively, a closed position with the index finger extended (see FIG. 7)—which represents a cursor "pick" signal. The system 50 recognizes this second predetermined hand configuration and responsively causes the repositioned cursor 42 to "pick" or select the icon 44 as indicated by the asterisk 76 in FIG. 7A.

At this point, the user can further move the cursor 42, and execute additional pick signals, using his hand in its FIG. 6 and FIG. 7 configurations, or he can switch back to the typing mode by either (1) depressing the switch member 58 or (2) pressing one of the keys 29 as previously described.

It will be appreciated that the two hand configurations shown in FIGS. 6 and 7 are merely representative of many alternate hand configurations that could be used to perform the illustrated cursor control functions. Moreover, while it is particularly convenient for the user to utilize his hand in the observation zone 54 to manipulate the cursor 42, another suitable movable and reconfigurable object could be used in place of the user's hand if necessary or desired.

Turning now to FIG. 3, in addition to the previously mentioned display screen circuitry 40, the cursor control circuitry 46 and the video camera 52, the video controlled cursor system 50, which may be activated and deactivated by toggling the switch structure 56 as previously described, also includes comparator and position tracking circuitry 78 and reference image storage circuitry 80. Data indicative of the two representative hand configurations (shown in FIGS. 6 and 7) are appropriately stored in the circuitry 80.

In general, system 50 operates as follows. During operation of the system 50 when the computer has been switched from its typing mode to its cursor control mode, upon receiving an image 81 of the user's hand 74 within the in-focus observation zone 54 the video camera 52 transmits to the comparator and position tracking circuitry 78 an output signal 82 indicative of the received image 81, and of any movement of the hand within the observation zone, while the circuitry 78 is also receiving output signals 84 and 86 from the reference image storage circuitry 80. Signals 84 and 86 are respectively indicative of the stored first and second hand configuration images in the circuitry 80.

The comparator and position tracking circuitry 78 compares the camera-generated signal 82 to the stored hand configuration image signals 84,86 and, if the signal 82 matches either of the signals 84 and 86, transmits to the cursor control circuitry 46 an appropriate output signal 88 that, in effect, instructs the cursor control circuitry as to what cursor movement and/or action is required in conjunction with the detected hand configuration and/or hand movement within the observation zone 54. In response to the receipt of the signal 80, the cursor control circuitry 46 outputs a corresponding signal 90 to the display screen circuitry 40 which, in turn, carries out the cursor movement and/or function.

Figure 8:
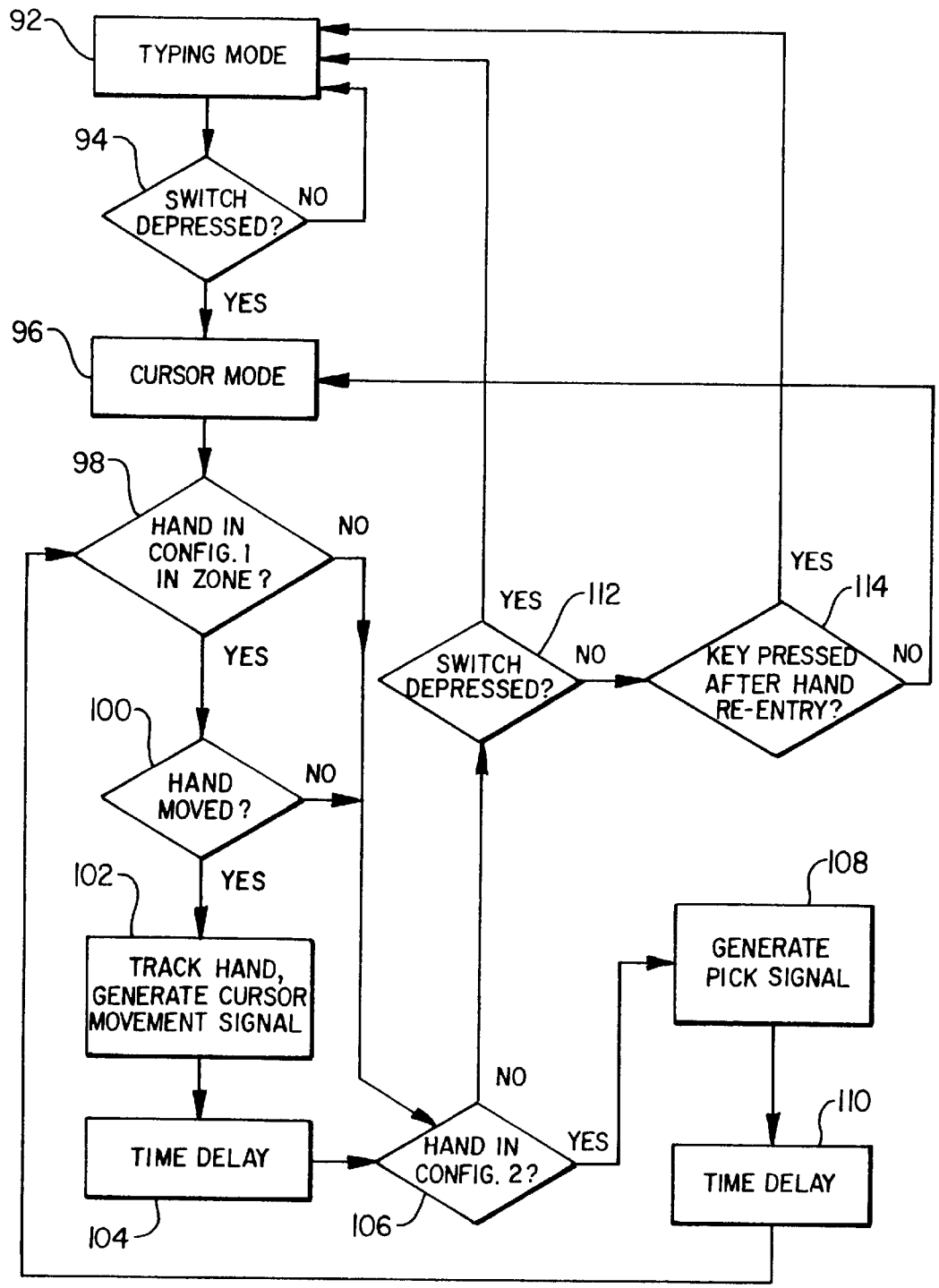
FIG. 8 is a schematic flow diagram illustrating the operation of the computer circuitry in the cursor control system.

FIG. 8 is a flow chart which schematically depicts in more detail the overall operation of the cursor control system 50 which was broadly described above in conjunction with FIG. 3. As indicated in the top left corner of the flow chart, it will be assumed for purposes of illustration and explanation that the computer 10 is initially in its keyboard typing mode 92, with the LED light member 66 activated in its red coloration and the system 50 continuously testing, at step 94, for the depression of the previously described switch member 58. If no depression of the switch member 58 is detected, the computer is maintained in its typing mode 92. Upon detecting a depression of the switch member 58, the system 50 switches the computer to its cursor control mode 96 and correspondingly changes the color of the LED light member 66 to green.

Next, at steps 98 and 100 the system queries whether the user's hand in its first configuration (i.e., the hand configuration shown in FIG. 6) is present in the observation zone and, if so, whether the hand has moved. If the answer to both of these queries is yes the system, at step 102, track the hand within the observation zone 54 and generates an appropriate cursor movement signal for use in repositioning the cursor 42 on the display screen 38. After the generation of this signal, the system transfers to step 106 after a suitable time delay 104. The system also transfers to step 106, bypassing steps 102 and 104, if the answer to the query in either of steps 98 and 100 is no.

In step 106 the system queries whether the user's hand is in its second configuration (i.e., the "pick" configuration shown in FIG. 7) within the observation zone 54. If it is, the system generates a pick signal at step 108 and, after an appropriate time delay at step 110, returns to step 98 to test for a further hand movement indicative of a desired additional cursor movement on the display screen. At step 106 if the system does not detect the presence of the user's hand in its second configuration within the observation zone, the system queries, in steps 112 and 114 whether (1) the switch member 58 has been depressed again, or (2) a key has been depressed after re-entry into the observation zone of the user's hand. If either of these events has occurred, the system automatically switches the computer back to its typing mode 92. If neither of these events has occurred the system maintains the computer in its cursor control mode by returning to step 96 as indicated. In the event that the circuitry returns the system to its typing mode via step 114, the circuitry, via a suitable connection of a portion thereof to the LED light element leads 70 (see FIG. 5), bypasses the switch structure 56 and automatically returns the LED light 66 to its red typing mode color even though the switch has not been depressed.

As can be seen from the foregoing, the video controlled cursor system 50 provides the computer user with a great deal of flexibility in regulating the movement on the display screen 38 of the cursor 42, and the selection action associated with the cursor. The use of the video camera 52 permits the user of the computer 10 to conveniently control cursor movement from a position directly over the keyboard 28 without the necessity of placing any physical equipment on the keyboard (other than the diminutive switch member 58) or on the desktop area leftwardly or rightwardly adjacent the keyboard. The system 50 also quite easily accommodates both left and right handed users, and permits substantially unfettered hand movement over relatively large distances to easily handle correspondingly long cursor movement distances on the display screen.

Additionally, because the user's changing hand configurations are detected and used to provide the cursor with selection functions, the need to position "pick" buttons on or adjacent the computer base housing 14 is desirably eliminated. Moreover, the cursor control movements of the user's hand are quite intuitive and thus easy to learn and implement.

The placement of the video camera 52 at a level higher than the selected hand manipulation/observation zone provides the ability to readily discern three dimensional hand shapes, thereby giving the system 50 a degree of operational sophistication and flexibility lacking in two dimensional optical digitizing systems. Additionally, the elimination of small objects such as pick buttons, a fixed location trackball and the like make the system 50 more comfortable to use than many other types of pointing systems currently being used on computers.

In addition to being used in a cursor positioning control mode, the video camera 52 can, if desired, be mounted in a manner permitting it to be upwardly pivoted to capture an image of the computer user's head and shoulders for video conferencing purposes, thus desirably achieving a dual use from the video camera.

Figure 9:
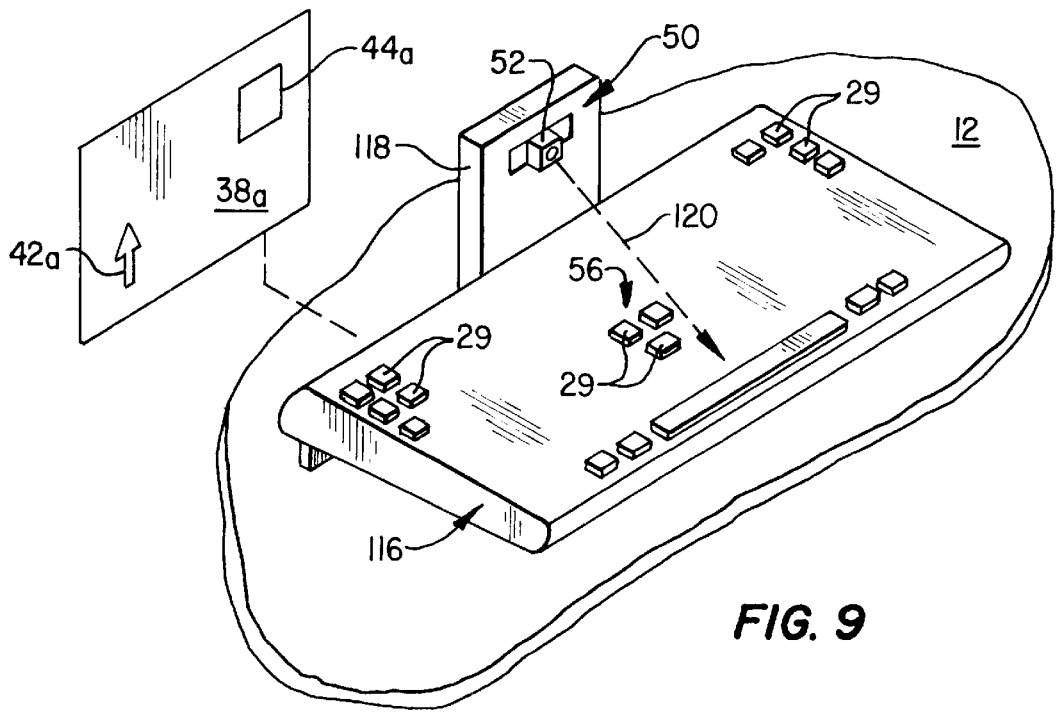
FIG. 9 is a simplified perspective view of a representative alternate mounting of the video camera portion of the cursor control system on a desktop computer system keyboard.

While the video controlled cursor system 50 has thus far been representatively illustrated as being incorporated in a portable notebook computer 10, it will be readily appreciated that it can alternatively be incorporated to advantage in other types of computer systems such as a desktop computer system. An example of such incorporation of the system 50 is illustrated in FIG. 9 in which the system 50 is used in conjunction with the separate keyboard portion 116 of a desktop computer system having a display monitor 38$a$ upon which a movable cursor 42$a$ and a selectable icon 44$a$ may be generated.

In this application the pivotable video camera 52 is mounted on a suitable vertical support structure 118 centrally secured to a rear side of the keyboard 116 and holding the video camera 52 in an elevated orientation relative to the keyboard 116 to permit the camera to be aimed downwardly and forwardly at the observation zone extending along the top side of the keyboard 116.

While the typing/cursor control mode switch structure 56 has been representatively illustrated as being used in conjunction with a video camera-based cursor system, it will be readily be appreciated by those of skill in this particular art that it could also be used to advantage in nonvideo-based systems as well to selectively toggle back and forth between typing and cursor modes or for other function control for the computer.

The foregoing detailed description is to be clearly understood as being given by way of illustration and example only, the spirit and scope of the present invention being limited solely by the appended claims.

What is claimed is:

1. Computer apparatus comprising:
   a keyboard having a series of manually depressible keys disposed on a top side thereof;
   an observation system operable to monitor a three dimensional observation zone extending along said top side of said keyboard;
   control circuitry associated with said observation system and having a typing mode and a cursor control mode, said control circuitry, when in said cursor control mode, being operative in response to detection by said observation system of a control movement of a predetermined object through said observation zone to create a control signal useable to move a cursor on a display screen in a manner corresponding to the detected control movement; and
   a manual switch structure associated with said keyboard and operable to selectively switch said control circuitry between said typing and cursor control modes thereof, said control circuitry being further operative to switch from said cursor control mode to said typing mode in response to the sequential detection by said observation system of a withdrawal of said predetermined object from said observation zone, the re-entry of said predetermined object into said observation zone, and the depression of one of said keys.

2. The computer apparatus of claim 1 wherein said keyboard is a portable computer keyboard.

3. The computer apparatus of claim 1 wherein said keyboard is a desktop computer system keyboard.

4. The computer apparatus of claim 1 wherein said predetermined object is a hand of a user of said computer apparatus.

5. The computer apparatus of claim 1 wherein said observation system includes a video camera operative to monitor said observation zone.

6. The computer apparatus of claim 1 wherein said manual switch structure is positioned within said observation zone.

7. The computer apparatus of claim 1 wherein:
   said keyboard has a home row of keys, and
   said manual switch structure is reachable and operable by a user of said computer apparatus while the user's fingers generally remain on said home row of keys.

8. The computer apparatus of claim 1 wherein said manual switch structure has a depressible actuation portion projecting upwardly between a plurality of said keys on said keyboard.

9. The computer apparatus of claim 1 wherein said manual switch structure has an actuation portion which may be pressed and released to activate one of said typing and cursor control modes, and then pressed and released again to activate the other of said typing and cursor control modes.

10. The computer apparatus of claim 1 wherein said manual switch structure includes:
    a manually engageable actuation portion, and
    visual indicia means for providing said actuation portion with a first appearance in response to activation of said typing mode, and a second, different appearance in response to activation of said cursor control mode.

11. The computer apparatus of claim 10 wherein said visual indicia means are operative to provide said actuation portion with a first coloration in response to activation of said typing mode, and a second coloration in response to activation of said cursor control mode.

12. The computer apparatus of claim 1 wherein:
    said object is selectively changeable to a plurality of different configurations, and
    said control circuitry is further operative to differentiate between said different configurations of said object within said observation zone and alter said control signal in different manners correlated to each configuration.

13. The computer apparatus of claim 12 wherein said control circuitry is operative to alter said control signal in a manner using said cursor to select an area of said screen in response to the presence of said object in a pick configuration thereof in said observation zone.

14. Computer apparatus comprising:
- a keyboard having a series of manually depressible keys disposed on a top side thereof, said keys having a home typing row;
- a screen upon which a movable cursor may be displayed;
- an observation system operable to monitor a three dimensional observation zone extending along said top side of said keyboard;
- control circuitry associated with said observation system and having a typing mode and a cursor control mode, said control circuitry, when in said cursor control mode, being operative in response to detection by said observation system of a control movement of a hand of a user through said observation zone to generate a control signal and use said control signal to move said cursor on said screen in a manner corresponding to the detected control movement; and
- a manual switch structure associated with said keyboard and operable to selectively switch said control circuitry between said typing and cursor control modes thereof, said control circuitry being further operative to switch from said cursor control mode to said typing mode in response to the sequential detection by said observation system of a withdrawal of the user's hand from said observation zone, the re-entry of the user's hand into said observation zone, and the depression of one of said keys.

15. The computer apparatus of claim 14 wherein said observation system includes a video camera operative to monitor said observation zone.

16. The computer apparatus of claim 15 wherein:
- said computer apparatus is a portable computer having a base housing on which said keyboard is carried, and a lid housing, on which said screen is carried, said lid housing being supported on said base housing for movement relative thereto between open and closed positions, and
- said video camera is carried by said lid housing and operable to monitor said observation zone when said lid housing is in said open position thereof.

17. The computer apparatus of claim 15 wherein said keyboard is a desktop computer system keyboard.

18. The computer apparatus of claim 17 wherein said video camera is supported on said keyboard in an elevated position relative thereto.

19. The computer apparatus of claim 14 wherein said control circuitry is further operative to differentiate between different configurations of the user's hand within said observation zone and alter said control signal in different manners correlated to each configuration.

20. The computer apparatus of claim 14 wherein said control circuitry is operative to alter said control signal in a manner using said cursor to select an area of said screen in response to the presence of the user's hand in a pick configuration in said observation zone.

21. The computer apparatus of claim 14 wherein said manual switch structure is reachable and operable by a user of said computer apparatus while the user's fingers generally remain on said home row of keys.

22. The computer apparatus of claim 14 wherein said manual switch structure has a depressible actuation portion projecting upwardly between a plurality of said keys on said keyboard.

23. The computer apparatus of claim 14 wherein said manual switch structure has an actuation portion which may be pressed and released to activate one of said typing and cursor control modes, and then pressed and released again to activate the other of said typing and cursor control modes.

24. The computer apparatus of claim 14 wherein said manual switch structure includes:
- a manually engageable actuation portion, and
- visual indicia means for providing said actuation portion with a first appearance in response to activation of said typing mode, and a second, different appearance in response to activation of said cursor control mode.

25. The computer apparatus of claim 24 wherein said visual indicia means are operative to provide said actuation portion with a first coloration in response to activation of said typing mode, and a second coloration in response to activation of said cursor control mode.

26. Computer apparatus comprising:
- a keyboard having a series of manually depressible keys disposed on a top side thereof, and a zone extending along said top side and into which a user's hand may be placed to operate said keys; and
- a control system operative to permit said keyboard to be switched between (1) a typing mode, and (2) a cursor control mode in which movement of the user's hand through said zone is operative to create a control signal useable to move a cursor on a display screen in a manner corresponding to such movement of the user's hand,
- said control system functioning to switch said keyboard from said cursor control mode to said typing mode in response to the sequential (1) movement of the user's hand out of said zone, (2) movement of the user's hand back into said zone, and (3) the depression of one of said keys.

27. The computer apparatus of claim 26 wherein said keyboard is a portable computer keyboard.

28. The computer apparatus of claim 26 wherein said keyboard is a desktop computer keyboard.

29. The computer apparatus of claim 26 further comprising a display screen operatively connected to said keyboard.

\* \* \* \* \*